May 10, 1960     W. M. COPELAND     2,936,140
RESILIENT MOTOR SUPPORT
Filed Nov. 1, 1955
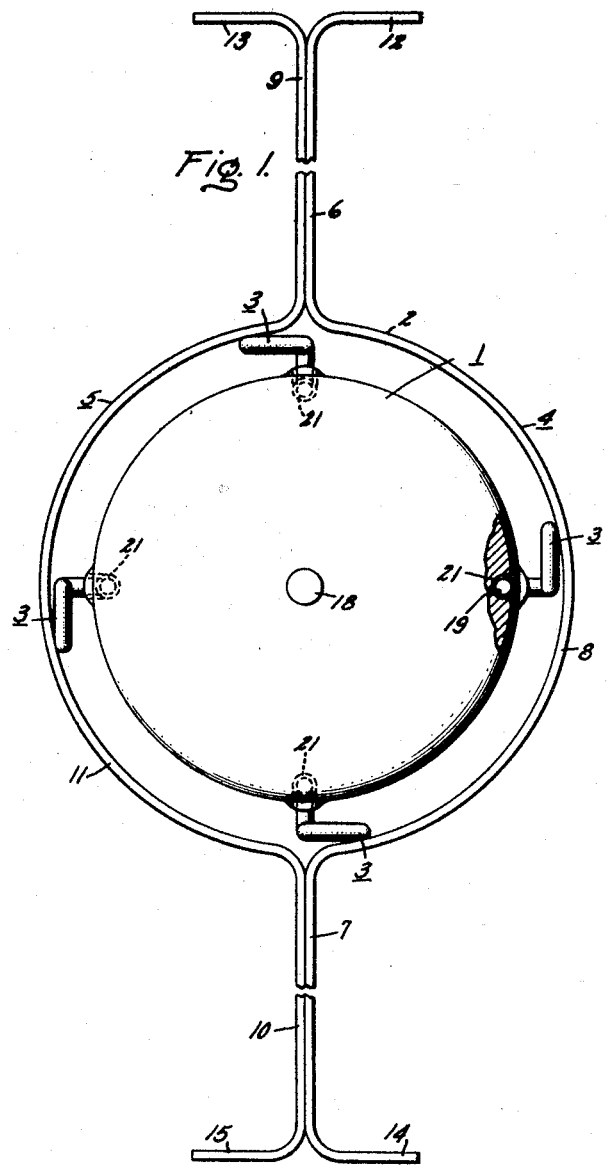
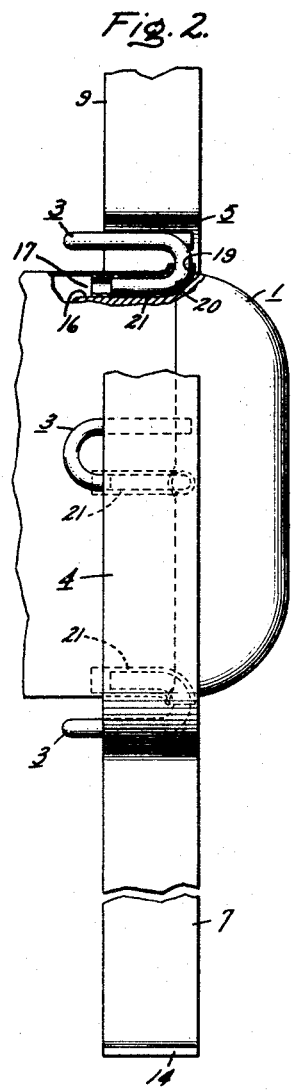
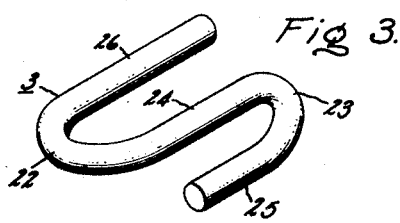
Inventor:
William M. Copeland,
by Lawrence R. [signature]
His Attorney.

United States Patent Office 2,936,140
Patented May 10, 1960

2,936,140

RESILIENT MOTOR SUPPORT

William M. Copeland, Stratford, Conn., assignor to General Electric Company, a corporation of New York Application November 1, 1955, Serial No. 544,119

7 Claims. (Cl. 248—26)

This invention relates to resilient motor supporting means.

It is frequently necessary or desirable to provide motors with resilient supporting means for reducing vibration, the transmission of vibration, and the attendant noise resulting from vibration. My invention is concerned with such a supporting means.

Accordingly, it is an object of this invention to provide an improved resilient supporting means for a motor.

In accordance with one aspect of this invention, a relatively fixed supporting bracket is spaced from the motor to be supported. The motor to be supported is provided with a recess therein. A resilient wire hook is connected at one end thereof to the supporting bracket and the other end of the wire hook is inserted in the recess in the motor. By this arrangement, a very simple yet effective resilient support is achieved.

Other objects and attendant advantages of this invention will be apparent from the following description taken in connection with the accompanying drawing in which:

Figure 1 is a front elevation view partially in cross section, showing my improved motor support;

Fig. 2 is a side elevational view partially in cross section showing my improved motor support; and Fig. 3 is a perspective view showing a resilient hook.

Referring now to Fig. 1 of the drawing, there is illustrated a motor 1 resiliently supported on a mounting bracket 2 by a plurality of resilient hooks 3.

Mounting bracket 2 is provided for properly orienting motor 1 in a fan casing or other external structure (not shown). In the arrangement illustrated, mounting bracket 2 consists of two identical straps 4 and 5. Strap 4 is provided with two end portions 6 and 7 along with a central portion 8. In like manner, strap 5 is provided with end portions 9 and 10 along with a central portion 11. In the embodiment shown, central portions 8 and 11 are bent to form a semi-circle. However, it is to be understood that other configurations dictated mainly by the shape of the motor would be within the scope of this invention. Straps 4 and 5 may be welded back to back thereby to form a circular ring surrounding motor 1. As shown in Fig. 1, extremities 12, 13, 14 and 15 of end portions 6, 9, 10, and 7, respectively, may be bent perpendicular to the end portions for connection to a fan casing or other external structure (not shown).

I provide means for connecting hooks 3 to motor 1. In the arrangement illustrated, this comprises recesses 16 formed in motor 1. As shown in Fig. 2, each recess includes an elongated portion 17 substantially parallel to motor shaft 18, a short portion 19 substantially perpendicular to said elongated portion and a curved portion 20 connecting portions 17 and 19. In order to resiliently connect hooks 3 to motor 1, resilient sleeves 21 may be inserted within each recess 16. Sleeves 21 may be formed from rubber or like material to provide the requisite resilient connection.

Hooks 3 are provided for connecting motor 1 to mounting bracket 2. As shown in Fig. 3, each hook comprises a piece of resilient wire having two bends 22 and 23 of approximately 180° formed therein and three straight portions 24, 25 and 26. The plane of bend 22 is disposed approximately perpendicular to the plane of bend 23. Using a letter of the alphabet, it can be said that spring hooks 3 comprise two U-shaped portions disposed in perpendicular planes. It can be seen that each hook 3 includes a straight portion 24 connecting the two bends, one straight end portion 25 extending from bend 23 and another straight end portion 26 extending from bend 22. It should be noted that straight portions 24, 25 and 26 are substantially parallel to each other. End portions 26 of hooks 3 may be welded or otherwise connected to the inner circumferential surface of bracket 2. The other end portions 25 of each hook 3 are inserted within recesses 16 formed in motor 1.

The resiliency characteristics of my improved support will now be described. It should be appreciate that the free length of each spring hook 3 from the last weld or connection to bracket 2 to motor 1 is relatively long. The length of this free end portion is designed so that the natural frequency of vibration of the spring is as far as possible away from the frequency of vibration and harmonics of the motor itself. Further, for example, if an electric motor driven by a sixty cycle current is being supported, spring 3 is designed so that its natural frequency of vibration is displaced from sixty cycles per second or the harmonics thereof in order to avoid reinforcement.

It can be seen readily that motor 1 is resiliently supported by springs 3 and their associated rubber sleeves 21. It should, also, be apparent that motor 1 has maximum freedom of motion along lines perpendicular to its shaft 18. Motion along these lines may cause bending of arms 24, 25 and 26 as well as a certain amount of torsion in hooks 3 and in their rubber mounting sleeves 21. Motor 1 has minimum freedom of movement along lines parallel to its shaft 18.

While there has been shown and described a particular embodiment of this invention, it will be obvious to those skilled in the art that various changes and modifications can be made therein without departing from the invention, and, therefore, it is aimed by the appended claims to cover all such changes and modifications as fall within the true spirit and scope of the invention.

What I claim as new and desire to secure by Letters Patent of the United States is:

1. A motor and a support therefor comprising a motor having a recess therein, a relatively fixed supporting means spaced from said motor, and a double U-shaped wire hook having two ends, the plane of one U being disposed at an angle to the plane of the other U, one end of the wire hook being fixed to said supporting means and the other end of said wire hook being disposed within said recess whereby to support said motor.

2. A motor and a support therefor comprising two straps, each strap having two end portions and a central portion, the end portions of said straps being fixed to each other and the central portions thereof being spaced apart so as to form an opening therebetween, a motor positioned centrally in said opening, a recess formed in said motor, and a double U-shaped wire hook having two ends, the plane of one U being disposed at an angle to the plane of the other U, one end of said wire hook being fixed to one of said straps and the other end of said wire hook being disposed within said recess whereby to support said motor.

3. A motor and a support therefor comprising two straps, each strap having two end portions and a central portion, the end portions of said straps being fixed to each other and the central portions being spaced from each other so as to form an opening therebetween, a motor centrally positioned in said opening, said motor being provided with a recess, a double U-shaped wire hook having two ends, the plane of one U being disposed at an angle to the plane of the other U, one end of said wire hook being fixed to said supporting means and the other end of said wire hook being disposed within said recess, and a rubber sleeve positioned within said recess and surrounding a portion of said wire hook whereby to support said motor.

4. A motor and a support therefor comprising two straps, each strap having two end portions and a central portion, the end portions of said straps being fixed to each other and the central portions being spaced from each other so as to form a circular ring having an inner circumferential surface, a motor centrally positioned in said ring, said motor being provided with a plurality of recesses, a plurality of double U-shaped wire hooks each having two ends, the plane of one U being disposed at an angle to the plane of the other U, one end of each of said wire hooks being fixed to the inner circumferential surface formed by said straps and the other end of each of said hooks being disposed within a respective recess within said motor whereby to support said motor.

5. A motor and a support therefor comprising a motor having a plurality of recesses therein, a relatively fixed supporting means spaced from said motor casing, a plurality of double U-shaped wire hooks each having two ends, the plane of one U being disposed at an angle to the plane of the other U, one end of each of said wire hooks being fixed to said supporting means, the other end of each of said wire hooks being disposed within a respective recess within said motor, and a plurality of rubber sleeves positioned within each of said recesses and surrounding one end of said wire hooks.

6. A motor and a support therefor comprising a motor having a recess therein, a relatively fixed supporting means spaced from said motor, and a double U-shaped wire hook having two ends, two bends, and three straight portions, the straight portions of the U's being disposed generally parallel to each other, and the plane of one U being arranged generally perpendicular to the plane of the other U, one end of the wire hook being fixed to said supporting means and the other end of said wire hook being disposed within said recess whereby to support said motor.

7. A motor and a support therefor comprising two straps, each strap having two end portions and a central portion, the end portions of said straps being fixed to each other and the central portions being spaced from each other so as to form a circular ring having an inner circumferential surface; a motor centrally positioned in said ring, said motor being provided with a plurality of recesses; a plurality of double U-shaped wire hooks each having two ends, two bends, and three straight portions, the straight portions of the U's being disposed generally parallel to each other, and the plane of one U being arranged generally perpendicular to the plane of the other U; one end of each of said wire hooks being fixed to the inner circumferential surface formed by said straps and the other end of each of said hooks being disposed within a respective recess within said motor thereby to support said motor.

References Cited in the file of this patent

UNITED STATES PATENTS

| | | |
|---|---|---|
| 1,040,576 | Pieper, et al. | Oct. 8, 1912 |
| 1,935,179 | Orear | Nov. 14, 1933 |
| 2,013,756 | Kalischer | Sept. 10, 1935 |
| 2,096,621 | Skolfield | Oct. 19, 1937 |
| 2,684,825 | Laviana et al. | July 27, 1954 |
| 2,728,541 | Hansel | Dec. 27, 1955 |